United States Patent [19]

Lind

[11] 3,780,265
[45] Dec. 18, 1973

[54] APPARATUS FOR SENSING EMBOSSED INDICIA

[75] Inventor: Larry W. Lind, Spring Valley, Calif.

[73] Assignee: Cubic Corporation, San Diego, Calif.

[22] Filed: Feb. 22, 1972

[21] Appl. No.: 227,756

[52] U.S. Cl. .................................. 235/61.11 C
[51] Int. Cl. .................................... G06k 7/04
[58] Field of Search ........... 235/61.11 B, 61.11 C; 200/46

[56] References Cited
UNITED STATES PATENTS

| | | | |
|---|---|---|---|
| 3,612,833 | 10/1971 | Davis | 235/61.11 C |
| 3,566,082 | 2/1971 | Romstetter | 235/61.11 C |
| 3,671,720 | 6/1972 | White et al. | 235/61.11 C |

*Primary Examiner*—Daryl W. Cook
*Attorney*—Carl R. Brown et al.

[57] ABSTRACT

Apparatus for sensing and producing an electrical output corresponding to the numerals on a standard credit card. The apparatus employs a plurality of sensing belts, one for each digit to be sensed on the credit card. The belts are driven by friction clutches and are forced into contact with the numeral positions on the credit card by a bias button. Where the device is employed on the back side of the credit card, the belts contain raised numerals that pass over the corresponding depression of the numeral position on the credit card. When the proper numeral reaches the number area on the credit card, it drops in place, and locks up, to override the friction clutch. The belt includes an electrical contact, positioned by the belt lock up in a particular numeral, and therefore electrically identifies that numeral. A particular numeral order is provided for use with credit cards employing the Farington Font to avoid false sensing.

6 Claims, 8 Drawing Figures

APPARATUS FOR SENSING EMBOSSED INDICIA

BACKGROUND OF THE INVENTION

Numerous devices have been proposed for the purpose of automatically sensing and transmitting information from credit cards or similar articles. These devices have a potentially large market because of the wide usage of credit cards and considerable problems related to bad credit and to inefficient billing practices.

Of the prior art devices that have been proposed, there are none that combine the dual requirements of low cost, and high reliability. This is particularly so with respect to devices that may be utilized with existing credit cards. The capability of operating with existing credit cards is important because a device requiring a unique card, would require a complete re-issue of an entire series of cards to accommodate a particular system and would limit their use to a particular credit card reading device.

Of those prior art credit card readers, designed for installation at the selling location so that they may instantly transmit information with regard to the sale to a computer for recording and billing purposes, there are none that are practical from an initial cost or from a maintainability standpoint.

Thus it is desirable to have a credit card reader that is inexpensive to produce and maintain especially where such an apparatus is adaptable for use with existing credit cards.

SUMMARY OF THE INVENTION

An exemplary embodiment of the invention provides an apparatus suitable for sensing indicia on articles, such as credit cards. The apparatus of the exemplary embodiment is adapted for use in association with a credit card having embossed indicia. The apparatus is capable of sensing from either the front or back side of the credit card where the numerals or other indicia are raised and stamped to create a projection from one side, and a cavity on the other side, in the shape of the indicia bit, such as a number to be sensed.

A basic component of the invention is a sensing belt. The belt has a plurality of shapes embossed onto, or into its surface. These numerals are of size corresponding to the size of the numerals to be sensed, and are spaced along the belt, at equal intervals, and in an order that permits sensing of all the numerals without ambiguity. The standard Farington Font utilized on most credit cards, necessitates a particular order of numerals to avoid improper sensing. Such improper sensing is typified by the situation wherein the sensing numeral 1 3 precedes the numeral 8. If an 8 was present on the credit card, the numeral 3 would drop into the impression and give a false indication that the numeral 3 was present. For this reason it is necessary that the numeral 8 precede the numeral 3. Similarly, the numeral 9 precedes the numeral 7, the numeral 5 precedes the numeral 2, the numerals 8 and 9 precede the numeral 0, and the numeral 4 precedes the numeral 1.

In the exemplary embodiment, the sensing means or belt utilizes a male embossed numeral that senses from the back side of the credit card. This relationship is advantageous in that the credit card printing surface may be utilized to produce a printed record of the transaction, at the same time that the sensing is taking place. Adequate frictional contact between the belt and the back of the card is ensured by a bias means, or bias button, that is movable from a spaced apart position for loading, to a position where it exerts a resilient bias against the back side of the belt, forcing it into contact with the credit card, and ensuring a regular and adequate lock up force when a numeral drops into place on the card.

The belt utilized with the invention is endless and passes over an idler pulley and a drive pulley as well as the article holder where the credit card is placed. The drive pulley, driven through a reducing gear train by an electric motor, powers the belts through a notched disc. The notches in the disc correspond to protrusions on the rear face of the belt and ensure a positive drive. Limitation on the total force exerted by the drive on the belt is provided by a frictional clutch. The idler pulleys provide a return path for the belts and provide a long return span for the belt to provide adequate space for the electrical output means.

The electrical output means comprises a series of pairs of electrical contacts that are connected when a contact member on the belt is opposite their position. Thus, when a belt stops on, for example, the numeral 3, the electrical contact attached to the belt is stopped in position opposite two contacts. The electrical signal from these contacts then becomes indicative of the sensing of the numeral 3. These electrical signals may be utilized to provide the electrical analogue input to any kind of vending or computing facility.

The article holder incorporated with the invention is utilized to position and hold a credit card in the proper relationship to the belts for sensing. Each of the belts passes under the credit card position and is held in place laterally by a plurality of tracks. These tracks are free to move laterally through a limited travel and thereby can accommodate a significant variation in the nominal placement of numbers on the credit card face.

The device resulting from the incorporation of the teachings of the invention is relatively simple in construction and utilizes no exotic hardware or electrical components. Further it is desirable from a standpoint of field servicing, since belt replacement would normally be the only repair necessary. An additional advantage is the capability of providing for numeral positions in excess of those actually required, to accommodate misalignment or improper insertion of the credit card. The device is also strong from a customer acceptance standpoint in that it is easy to provide direct validation that the machine is operating properly and reading the correct number by merely having visible numbers on the face of the tape, spaced by the same distance as the embossed indicia, and readable through a window, or similar opening, in the case of the machine. The ability to simultaneously produce a printed record of the transaction is another valuable characteristic of the invention, as is the minimum of two to one, lock-up-to-release ratio.

It is therefore an object of the invention to provide a new and improved apparatus for sensing embossed indicia.

It is another object of the invention to provide a new and improved apparatus for sensing numerals on credit cards.

It is another object of the invention to provide a new and improved apparatus for sensing embossed indicia on credit cards by physically matching embossed indicia on a moving tape.

It is another object of the invention to provide a new and improved order of numerals on a sensing tape.

It is another object of the invention to provide a new and improved apparatus for sensing credit card numerals that is low in cost.

It is another object of the invention to provide a new and improved apparatus for sensing numerals on credit cards that has a high degree of operational reliability.

It is another object of the invention to provide a new and improved apparatus for sensing numerals on credit cards that provides a direct validation of proper sensing.

Other objects and many attendant advantages of the invention will become more apparent upon a reading of the following detailed description together with the drawings in which like reference numerals refer to like parts throughout and in which.

Figure 1:
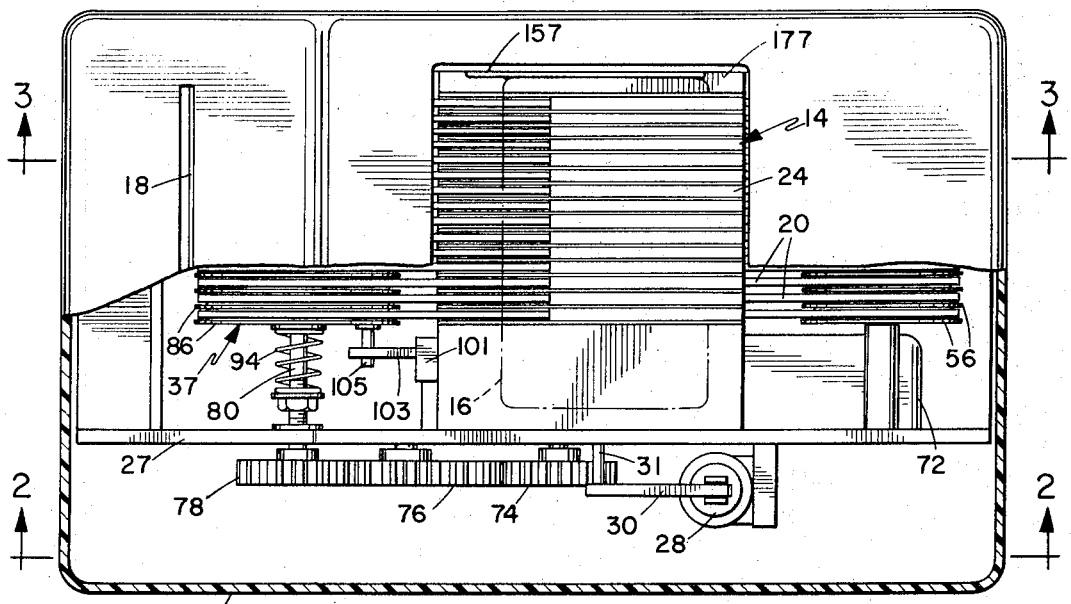
FIG. 1 is a top plan view of the apparatus, with the case cut away.

Referring now to the drawings, there is illustrated an exemplary embodiment of the apparatus for sensing embossed indicia. The apparatus is housed in a case 12 having a validation window 18.

The mechanism is supported in the case 12 between frame members 27 and supports a plurality of belts 20 on drive means 37, article holder 14 and idler pulleys 56. The belts are guided through an output means 171 by a tensioning roller 109.

Figure 7:
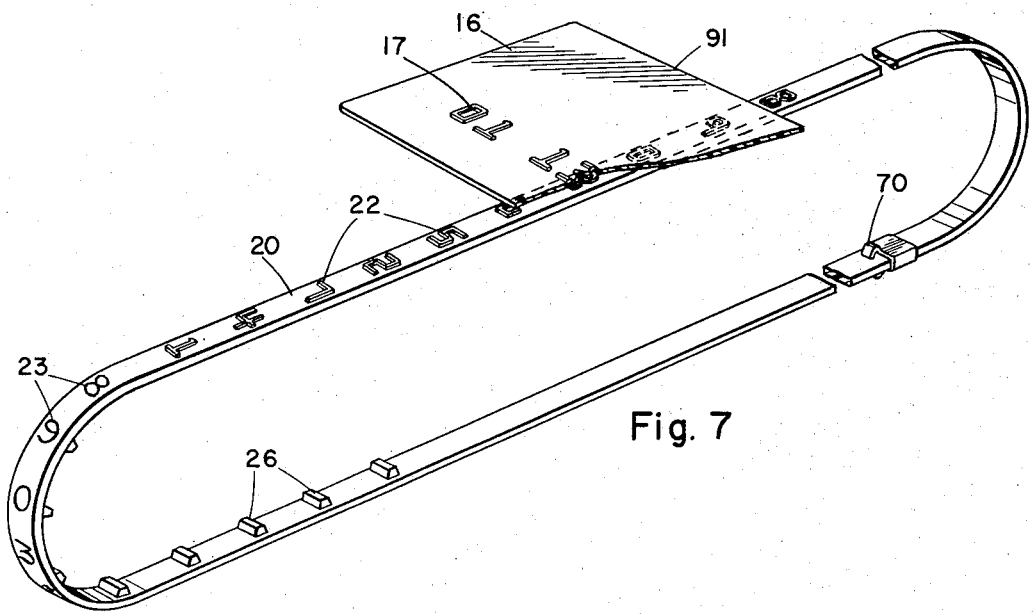
FIG. 7 is a perspective view of a typical belt, showing engagement with an embossed card.

The sensing tape or belt 20 illustrated in the exemplary embodiment is for use in association with an apparatus sensing the female impression on a credit card, and therefore has a plurality of embossed numerals 22 protruding from its upper surface. Subsequent to the embossed numerals, on the surface of the tape, is a series of numerals 23. This second series of numerals is printed on the surface of the tape and is utilized in conjunction with the validation window 18 to confirm the number being sensed by the tape. The order of numerals illustrated in FIG. 7 is important to the error free sensing capability of the invention. The tape is illustrated diagrammatically as passing under a credit card having a number 3, in position for sensing by the tape illustrated. With the tape in the position illustrated, the numerals 8, 9 and 0 would have already passed over the depression corresponding to the numeral 3, and would not have locked up with it because the numerals have one or more legs that prevent the tape from falling into the depression. The next numeral in line is the numeral 3. This numeral would fall into the depression, since its outline corresponds with the outline of the depression. On falling into place, the tape would lock up, that is, a strong resistance would be produced countering any tendency of the tape to continue movement.

Figure 5:
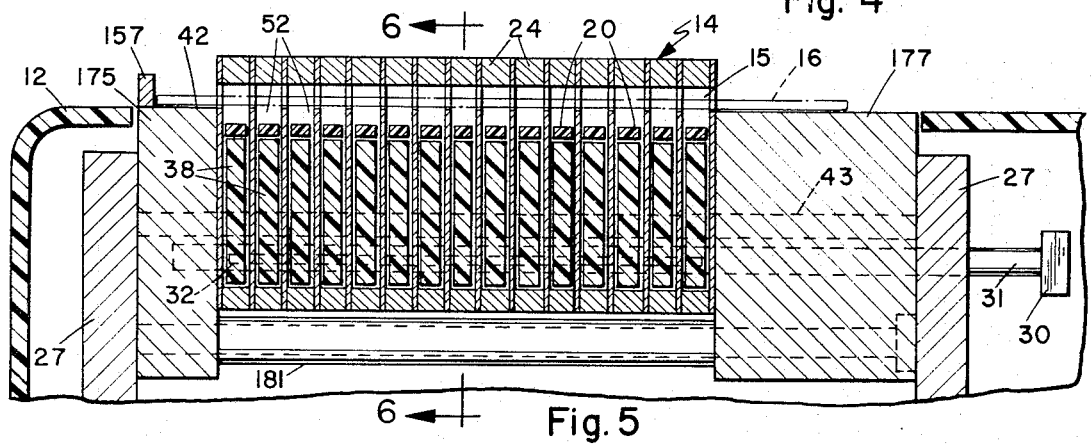
FIG. 5 is an enlarged sectional view taken on line 5—5 of FIG. 3.
Figure 6:
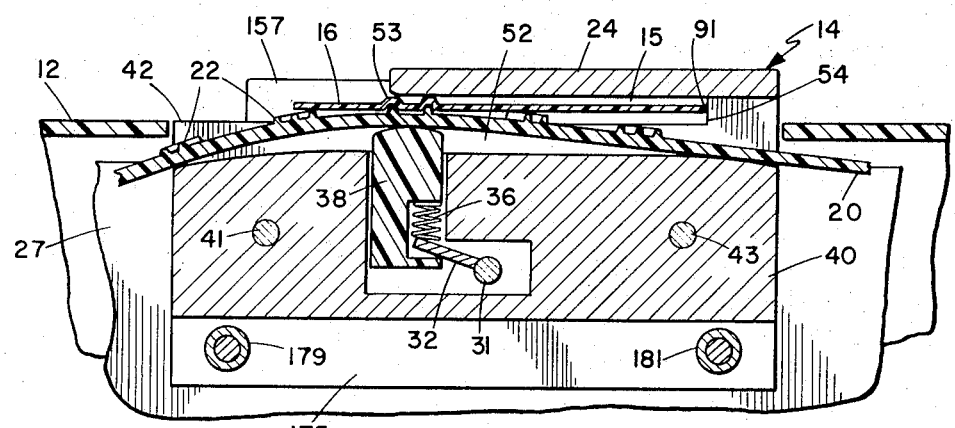
FIG. 6 is a sectional view taken on line 6—6 of FIG. 5.

Referring now to FIGS. 5 and 6, the details of the article holder of the invention are illustrated. The article holder accommodates the card holding belt alignment and biasing functions. The card 16 slides into a horizontal slot 15 in the top portion of holder 14 and initial card positioning is made against guide stop 157. The alignment of the numeral positions on the card is accomplished by tracks 52 in the upper portions 24 of the article holder. The protruding numerals 17 of the credit card 16 are guided in an alignment with those tracks after insertion by the operator. The alignment function is enhanced by the fact that the body portions 40 of the article holders are individually mounted for very limited lateral movement on rods 41 and 43 supported in article holder frame members 175 and 177. The frame members are spaced by spacer bars 179 and 181. The track 52 incorporates a stop 54, against which the rear edge 91 of the credit card abuts, when it is fully inserted in the holder. In this position, the credit card is supported against stop 54 carried vertically on the supporting surface 42. The placement and functioning of the tape is enhanced on the bias means or Teflon button 38, that is resiliently biased into contact with the tape by a solenoid 28 operable between open and closed positions and biased by return spring 33 toward the open position illustrated in FIG. 2. The solenoid transmits motion by arm 30 to pivot rod 31. The pivot rod 31 carries tab 32. Tab 32 engages bias springs 36 to urge the bias buttons into contact with the belt.

Figure 4:
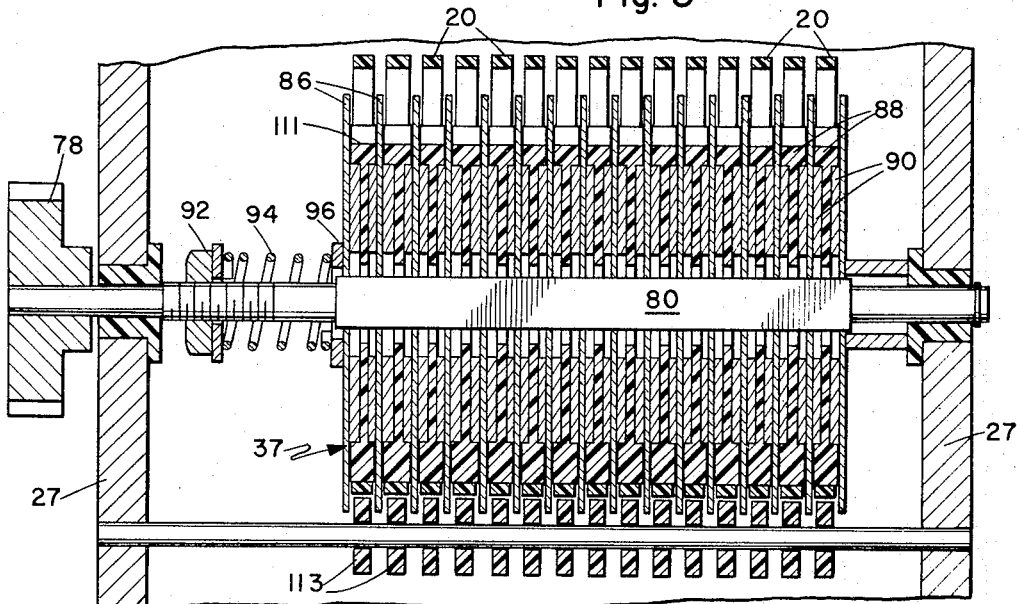
FIG. 4 is an enlarged sectional view taken on line 4—4 of FIG. 3.

Referring now to FIG. 4, the drive means or friction clutch 37 of the invention is illustrated. The clutch incorporates a plurality of drive discs 88, one for each sensing belt utilized in the apparatus. These drive discs are not keyed to the shaft 80 but are free to rotate with respect thereto. Motion of the shaft 80 is transmitted to the drive discs through friction discs 90. The use of a Dacron felt for the frictional material and nylon or Delrin for the drive discs produces an excellant combination of low friction and predictable force transmission. Force is transmitted to the felt by a plurality of clutch discs 86 which are keyed for rotation with the shaft 80, but which are free to move along the shaft to maintain proper alignment and accommodate wear. The de-clutching force is controlled by a clutch adjustment comprising a variable spring bias exerted by a spring 94 through washer 96 against the outermost clutch disc 86. The adjustment is varied through rotation of nut 92 along a threaded portion of the shaft 80.

Figure 2:
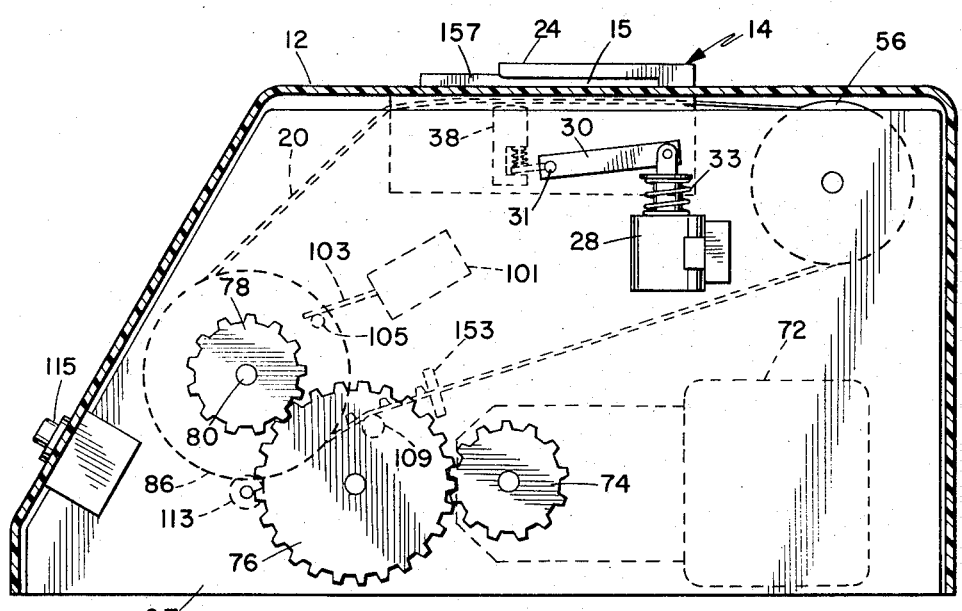
FIG. 2 is a sectional view taken on line 2—2 of FIG. 1.
Figure 3:
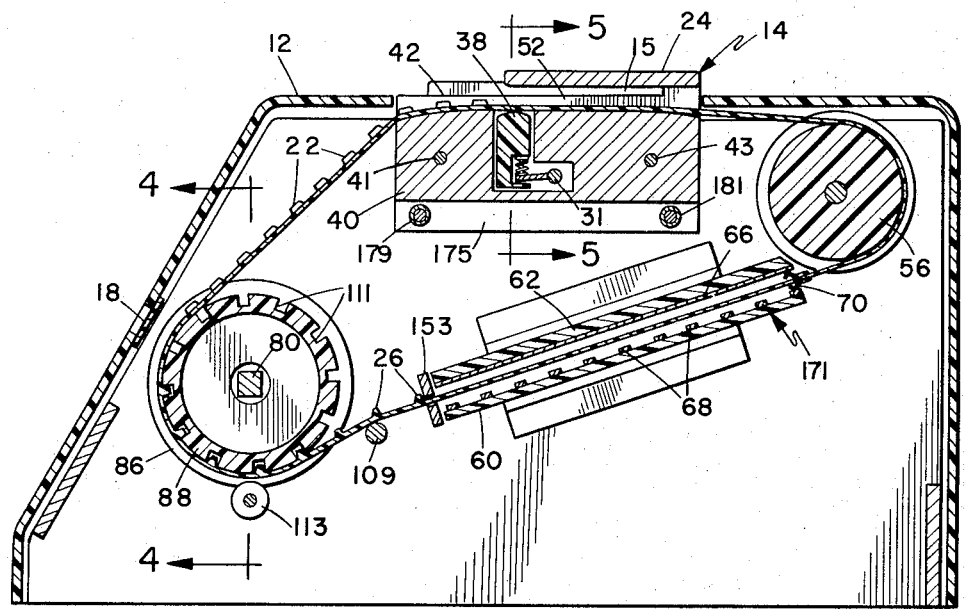
FIG. 3 is a sectional view taken on line 3—3 of FIG. 1.

Referring now most particularly to the side elevational view in FIG. 2, the drive means of the apparatus is illustrated. The drive motor 72 is connected by gears 74, 76, and 78 to the shaft 80 of the clutch mechanism. The limit switch 101 is illustrated with the switch actuator 103 tripped by contact with the trip stop 105 on end disc 86.

The belt 20 includes a plurality of protrusions 26 on its under surface which cooperate with correspondingly sized and spaced recesses 111 in the drive disc 88. Rollers 113 hold the belts in contact with the drive discs to create a positive drive by the protrusions 26 being received in drive disc recesses 111. The lower course of the belt passes between two printed circuit boards 60 and 62 of the output means 171. These boards are positioned closely adjacent to the belts course and are spaced somewhat less than the vertical spacing between opposed electrodes of a contact 70 carried on the belt. By this positioning the contact 70 completes a circuit between one of the number electrodes 68 and the ground electrode 66. This circuit completion is distinct for each character position since the contacts 66 are spaced by the same distance as the embossed numerals 22.

Figure 8:
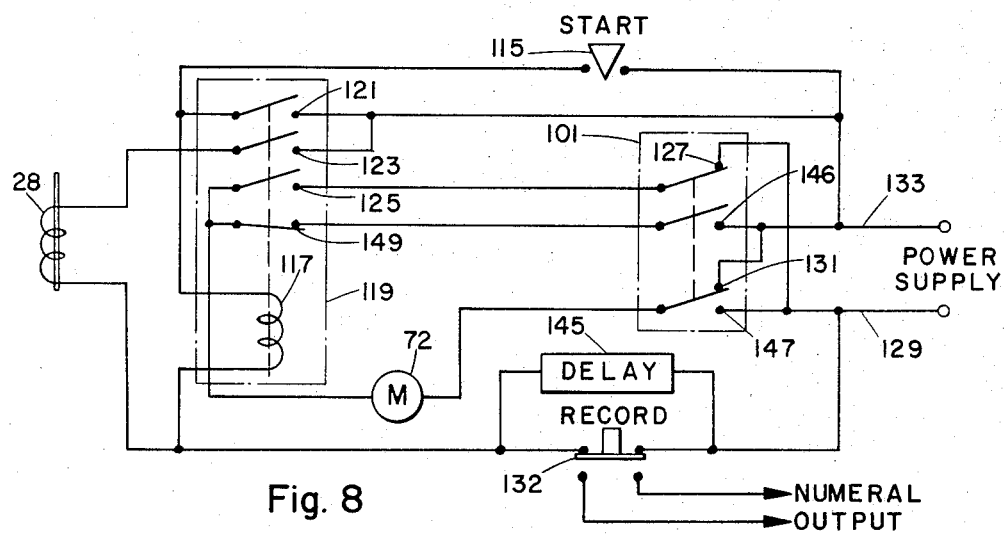
FIG. 8 is a basic wiring diagram of the apparatus.

Referring to FIG. 8, the electrical schematic circuit for the invention is illustrated. A start switch 115 is connected to coil 117 of relay 119. Initial actuation of switch 115 closes relay latching contacts 121, relay solenoid contacts 123, and relay motor forward contacts 125. This action delivers drive power to the motor 72, through closed motor contacts 127 of limit switch 101, from the power supply line 129. The return path from the motor 72 is through limit switch contacts 131 and power supply line 133. After full forward travel the motor 72 is disconnected by the tripping of the limit switch 101. The operator depresses the record switch 132 to deliver the numeral output signals through contacts 68. Delay circuit 145 maintains the relay 119 latched, and the solenoid 28 closed, for a sufficient interval to ensure that the numeral output signals are received and recorded. After delay circuit 145 times out, relay 119 unlatches, releasing solenoid 28 and therefore the bias buttons 38. At the same time the motor 72 is connected to the power supply through now closed contacts 146 and 147 of limit switch 101 and contacts 149 of relay 119, and is driven in the reverse direction to return the belts to their original positions. The initial alignment of the belts is ensured by stop 153 that engages the first protrusion 26 on the inside course of the belt causing the belts to be held and to override friction clutch 37 until the limit switch is again cycled by contact between the actuator arm 103 and trip stop 105.

OPERATION

In use, an operator inserts a credit card to be sensed into the article holder 14, by aligning it with the tracks 52 against the horizontal stop 157 in the article holder, and sliding it until it abuts against the rear face 54 of the article holder. When the card is in position, the operator activates the start switch 115 causing the motor 72 to move belts 20 and solenoid 28 to bias the buttons 38 toward the underside of the card. Each belt is guided by tracks 52 with respect to a particular number position on the credit card so that each number position is sensed by a discrete sensing belt. The embossed numerals on the belt are held in firm frictional contact with the card by the bias buttons 38, so that when the embossed numeral, corresponding to the numeral to be sensed, reaches the numeral position on the card, it is forced into the recess on the card, and held in position, to resist further movement of the belt. The clutch mechanism utilized with the invention allows each tape to stop when it achieves lock up with a numeral recess on the credit card. As each belt reaches its final position, the contact 70 comes to rest between the contact 68 and ground plane 66. After limit switch 101 is tripped, proper sensing can be confirmed by the operator reading the numerals 23 through validation window 18. The operator then depresses the record button 132 which transmits the numeral signals and activates the delay 145. After delay 145 times out, the motor 72 is reversed to return the belts to their original position with the first protrusion 26 in contact with the stop 153.

Having described my invention, I now claim:

1. A sensing element for use in a device for sensing embossed numerals utilizing the Farington Font, said sensing element comprising,
a member having embossed numerals of substantially the same size as the numeral size of the members to be sensed in spaced linear relationship, wherein the numeral 8 preceeds the numeral 3, the numeral 9 preceeds the numeral 7, the numeral 5 preceeds the numeral 2, the numerals 8 and 9 preceed the numeral 0 and the numeral 4 preceeds the numeral 1.

2. Apparatus for sensing the presence of indicia comprising:
article holder means for positioning an article having at least one indicia bit to be sensed,
sensing means having a plurality of comparison indicia in a linear spaced arrangement along a surface of said sensing means,
said comparison indicia comprising discrete configurations of said surface of said sensing means,
bias means for maintaining said sensing means in contact with said article,
drive means for creating relative movement between said article and said sensing means,
and, means for permitting said article and said sensing means to remain in a fixed relationship after matching comparison and article indicia are brought into contact.

3. Apparatus according to claim 2 wherein,
said sensing means comprises a belt having a plurality of spaced comparison indicia along one surface thereof,
and wherein said drive means moves said belt in a contacting relationship to said article.

4. The apparatus according to claim 3 wherein,
said means for permitting a fixed relationship comprises a clutch means associated with said drive means for limiting the drive force delivered to said belt.

5. Apparatus according to claim 3 wherein,
said belt includes a plurality of spaced visible indicia on a surface thereof comprising indicator means for providing a visual indication of the indicia being sensed.

6. Apparatus for sensing the embossed indicia on a credit card or similar article comprising:
article holder means for positioning an article having a plurality of embossed indicia over a plurality of sensing belt means,
said sensing belt means having a plurality of embossed indicia on a surface thereof, and positioned by said holder means for contact with a single one of said embossed indicia of said belt means,
said article holder means including alignment means for aligning an individual indicia bit on said article with one of said belt means,
output means for providing a distinct electrical ouput for each of a plurality of different indicia,
said output means comprising electrical contact means for contact with an output element on said tape means,
said electrical contact means comprising a plurality of circuit conductors positioned to be electrically completed by discrete positions of said electrical contact means,
drive means for moving said belt means, said drive means comprising a motor operatively connected to friction clutch means for transferring force up to a predetermined maximum to said belt means, said friction clutch means comprising a plurality of belt disc means for receiving and driving the belts of said belt means, drive disc means for rotating under the influence of said motor, and said drive disc means being frictionally connected to said belt disc to transfer force to said belt discs and belts.

* * * * *